Dec. 23, 1924.　　　　　　　　　　　　　　　　　　1,520,623
H. H. WEISKOFF
DEVICE FOR BORING CONNECTING RODS, BUSHINGS, ETC
Filed May 1, 1923　　　　2 Sheets-Sheet 1
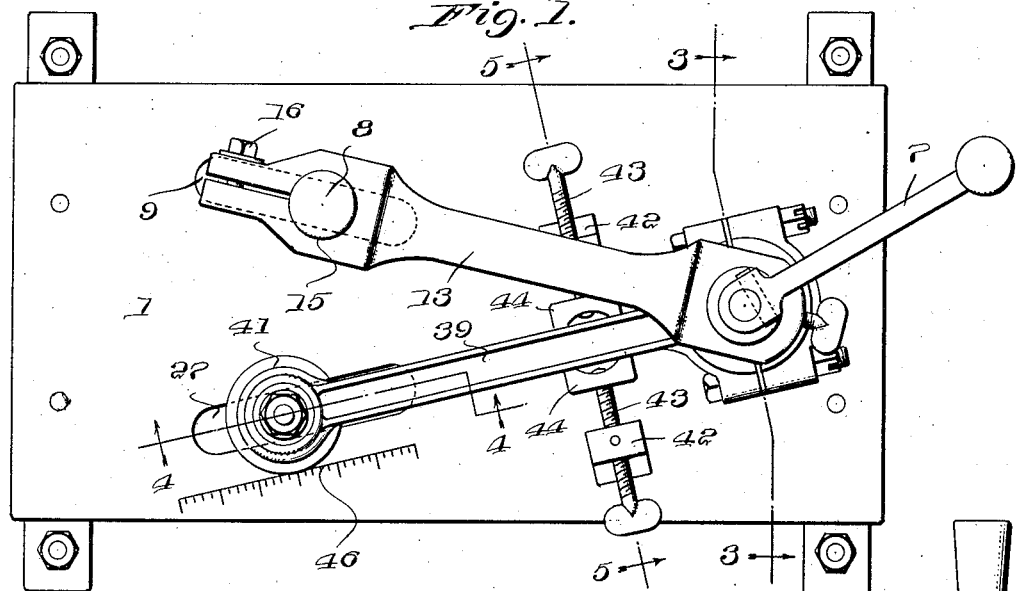
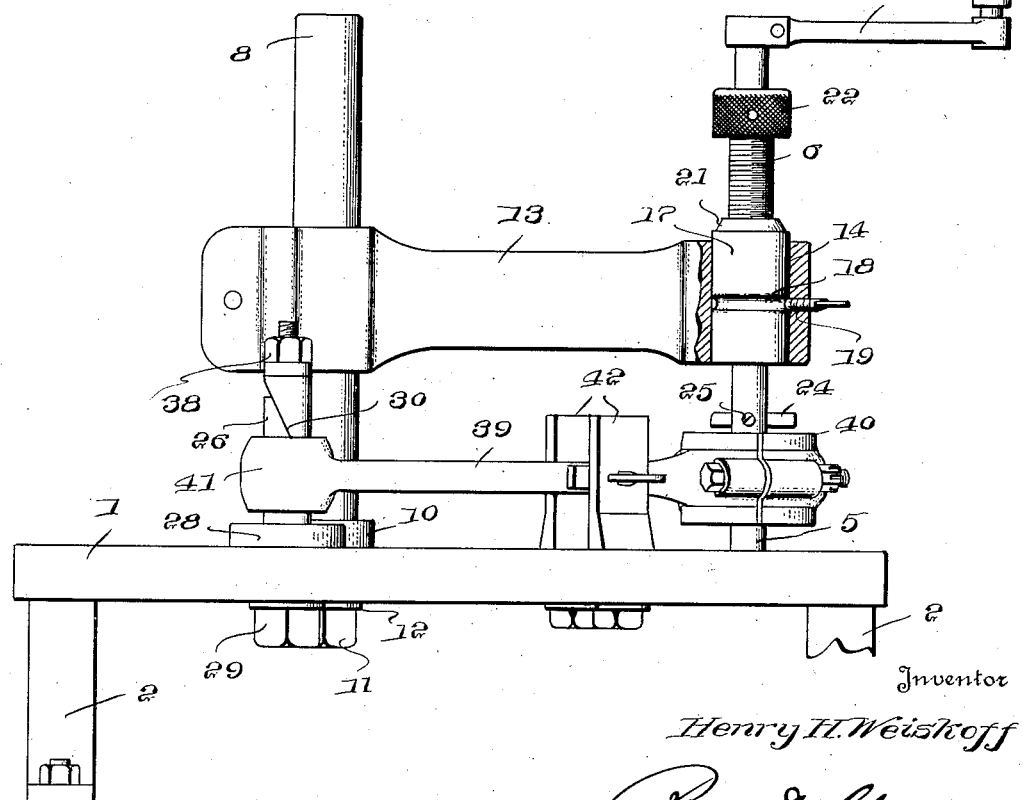
Inventor
Henry H. Weiskoff
By
Attorney Dec. 23, 1924.  1,520,623
H. H. WEISKOFF
DEVICE FOR BORING CONNECTING RODS, BUSHINGS, ETC
Filed May 1, 1923   2 Sheets-Sheet 2

Inventor
Henry H. Weiskoff
By
Attorney

Patented Dec. 23, 1924.

1,520,622

UNITED STATES PATENT OFFICE.

HENRY HARRY WEISKOFF, OF WILSON BOROUGH, PENNSYLVANIA.

DEVICE FOR BORING CONNECTING RODS, BUSHINGS, ETC.

Application filed May 1, 1923. Serial No. 635,990.

*To all whom it may concern:*

Be it known that I, HENRY H. WEISKOFF, a citizen of the United States, residing at Wilson Borough, in the county of Northampton and State of Pennsylvania, have invented new and useful Improvements in Devices for Boring Connecting Rods, Bushings, &c., of which the following is a specification.

This invention relates to a device for boring connecting rods, wrist pin bushings, etc.

One object of the invention is to provide a device of this character by means of which the crank shaft bearings of connecting rods may be easily and quickly bored for an accurate fit, and also by means of which wrist pin bushings, of regular or oversize, may also be accurately machined.

Another object of the invention is to provide a device of the stated character whereby bearings and bushings of different sizes may be bored, and whereby accurate adjustment of parts is permitted to properly center or aline a connecting rod for operation upon a bearing thereof, or to dispose a piston for operation upon a wrist pin bushing thereof.

The invention consists of the features of construction, combination and arrangement of parts, hereinafter fully described and claimed, reference being had to the accompanying drawings, in which:—

Figure 1 is a top plan view of a boring device embodying my invention.

Figure 2 is a slide elevation of the same, partly in section.

Figure 3:
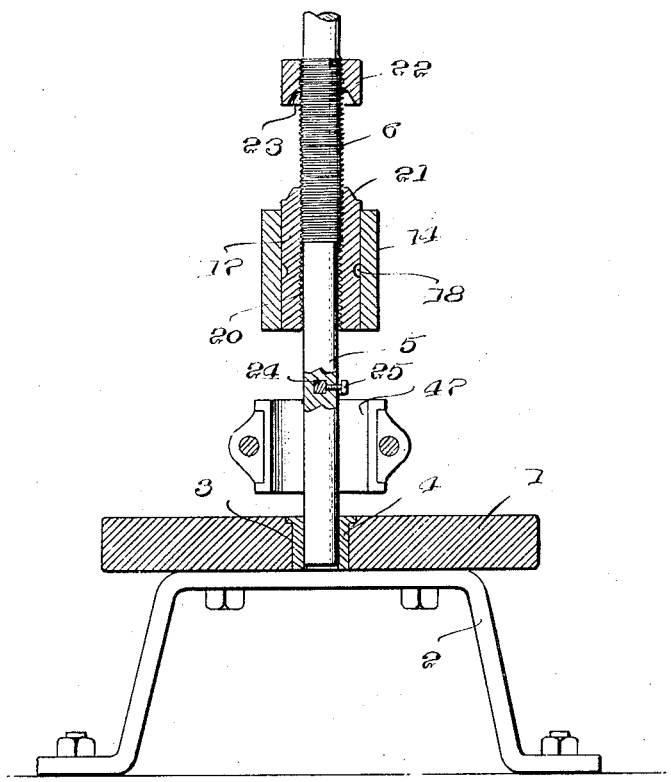
Figure 3 is a vertical section on line 3—3 of Figure 1.
Figure 4:
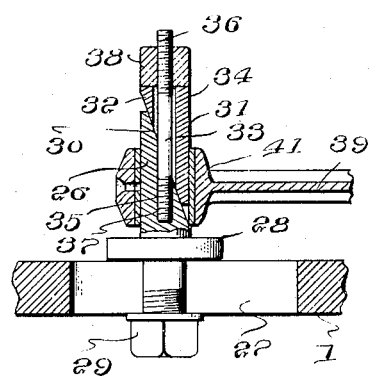
Figure 4 is a vertical section on line 4—4 of Figure 1.
Figure 5:
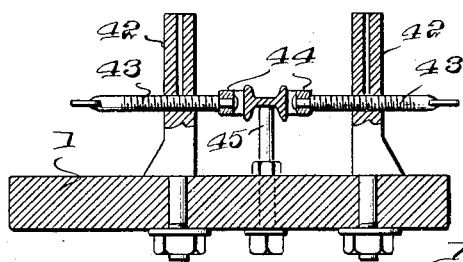
Figure 5 is a vertical section on line 5—5 of Figure 1.

In the practical embodiment of my invention I provide a base plate 1, secured at its opposite ends to brackets 2 having depending feet for adjustment to a suitable work bench or table. This base plate 1 is provided, centrally of its width and adjacent to one end thereof, with an opening 3 in which is fitted a bearing bushing 4 receiving the lower end of a vertically disposed tool carrying spindle or shaft 5, said shaft being provided with a threaded portion 6 and having at its upper end an actuating crank handle 7.

Extending upwardly from the base plate 1 is a supporting post 8 having its lower end extending downwardly through a slot 9 in said base plate and provided with a flange or collar 10 to rest upon the plate. Below said flange or collar 10 the end of the post fitted in the slot 9 is threaded to receive a clamping nut 11 coacting with a washer 12 engaging the underside of the base plate, the said lower end of the post 8 being thus adapted for sliding adjustment in the slot 9 and to be clamped in adjusted position by means of the nut 11 and washer 12. Supported by the post 8 is a horizontal supporting bar 13 terminating at its forward end in an eye or sleeve 14 and having at its opposite or rear end an opening 15 for passage of the post 8, said rear end of the bar 13 being split so that the walls of said opening 15 provide clamping jaws coupled by an adjusting screw 16, whereby the said rear end of the bar 13 is adapted for vertical adjustment to different elevations on the post 8 and to be clamped thereto in adjusted position.

The eye or sleeve 14 of the bar 13 has fitted therein a bushing member 17 having a groove or seat 18 receiving a set screw 19 on the eye or sleeve 14, whereby said bushing member 17 is removably fixed in position. The tool spindle or shaft 5 extends downwardly through the bushing member 17 and said bushing member is provided with internal threads 20 for engagement with the threaded surface 6 of said shaft or spindle, whereby, when the handle 7 is rotated in one direction to impart working motion to the said shaft or spindle 5, a downward feed motion will be imparted thereto, while, when the handle is turned in the reverse direction, the spindle will be moved upwardly or retracted. The bushing 17 has a tapered or conical upper surface 21, and mounted upon the threaded portion 6 of the spindle is an adjustable stop nut 22 having a conical recess 23 in its undersurface to engage the surface 21 when the nut comes in contact with the upper end of the bushing. The nut 22 is adjustable on the surface 6 to different working positions to form a stop or gage to limit the downward movement of the spindle 5 when set for truing or machining a bearing of any prescribed depth. The spindle 5 is transversely slotted to form a seat for a cutting tool 24 secured thereto by a set screw or other suitable fastening 25.

Arranged substantially in transverse alinement with the post 8 is a second supporting post or arbor 26 extending at its lower end downward through a slot 27 in the base plate 1 and having a flange or collar 28 to rest upon said base plate. Below the flange or collar 28 the post 26 is threaded to receive a clamping nut 29, such construction adapting it for sliding adjustment in the slot 27 and to be fixed in adjusted position. The upper end of the post body 26 is provided with an inclined or wedge surface 30 and arranged for cooperation therewith is a movable or adjustable wedge member 31, having an inclined surface 32 for sliding engagement with the inclined surface 30 of the said post body 26. The parts 26 and 31 form complemental portions of a split, expansible supporting post or arbor, which are adjustably connected by means of a fastening pin or stem 33. This pin or stem has a central smooth portion extending loosely through an opening 34 in the member 31 and upper and lower threaded end portions 35 and 36, the former engaging a threaded opening 37 in the post body 26 and the latter extending above the member 31 and receiving an adjusting and clamping nut 38, whereby the member 31 is adapted for vertical sliding adjustments on the member 26 and to be fixed in adjusted position for varying the effective size or diameter of said supporting post or mandrel, as will be readily understood.

In the use of the device for truing or machining a connecting rod bearing, the connecting rod 39 is disposed longitudinally between the shaft or spindle 5 and the post or arbor 26, the bearing eye 40 of said rod being disposed above and in axial alinement with the guide bushing 4, while the wrist pin eye 41 of said rod is arranged so as to embrace the post 26. The eye 40 will thus be disposed in position for the downward passage of the working portion of the shaft or spindle 5 therethrough, while the eye 41 will be engaged with the supporting post 26 and is adapted to be clamped to said post 26 by downward adjustment of the wedge member 31. The post 26 and its adjustable wedge member 31 cooperate with intermediate clamping means located between said post and the tool spindle for engagement with the body of the connecting rod. Such intermediate clamping means comprises brackets 42 fixed to the base plate 1 on opposite sides of the line of the center of the rod 39, said brackets being threaded to receive screw shafts 43 carrying clamping jaws 44 to engage opposite sides of the rod, whereby the body of the rod will be clamped and held firmly in position. Arranged on a line between said jaws 44 is a vertically disposed stud 45 extending upwardly from the base plate 1 to engage in the channel on the underside of the rod, said stud acting as a steady rest and cooperating with the clamping members to hold the connecting rod from both downward and lateral movements. With the parts in the position stated, it will be understood that the eye 40 will be disposed in position for a newly formed bearing bushing therein to be trued or machined by means of the cutting tool 24, preliminary to which the bushing may be formed within the eye 40 by pouring molten Babbitt metal thereinto, suitable formers being used to give proper shape to the bearing metal, in which operation the working end of the spindle 5 may be in raised or retracted position. When the Babbitt bushing has been formed and set the handle 7 may be operated to rotate the spindle 5 on its working motion, said spindle feeding downwardly by reason of its threaded engagement with the feed bushing 17, whereby the cutting tool 24 is rotated and fed downward, thereby truing or surfacing the bearing bushing held in the eye 40. In this operation the eye 40 is held in a properly centered position and the spindle 5 guided by the bushing 4, ensuring great rapidity and accuracy of operation.

It will be observed that the bar 13 and the supports for the connecting rod 39 are so disposed as to cause the bar 13 and connecting rod 39 to be disposed so as to extend on converging lines toward the shaft or spindle 5, thus permitting ready and convenient adjustment of the parts without interference, while providing for an easy and convenient centering action. It will also be observed that the slots 9 and 27 are correspondingly inclined, and that the posts 8 and 26 are adjustable in said slots to enable relative centering motions of the shaft or spindle 5 and the bearing eye 40 to be secured, such construction also adapting the device to hold and work upon connecting rods of any of the varying sizes in general use. When the eye 40 is approximately adjusted by adjustment of the bar member 13 or post member 26, or both, with relation to the line of motion of the spindle 5, final and extreme accuracy of adjustment may be secured, to substantially a micrometer degree by adjustment of the movable wedge member 31 to the extent required on the post member 26, whereby a centering action of the eye 40 will be obtained to an extremely accurate degree and the eye 41 simultaneously clamped to the post 26 in a firm and substantial manner. The base plate 1 may be provided with a gage 46 extending parallel with the slot 27 and laid off in suitable graduations in inches and fractions thereof for setting the post 26 to proper positions along the length of the slot to accord with the length of the connecting rod to be held and operated upon, enabling a rapid and accurate gaging action to be obtained. It will, of course, be understood that the stop nut 22 may be set to arrest the downward working motion of the spindle according to the depth of the surface of the bearing bushing 47 in the eye 40 which is to be machined, or to stop the motion of the tool at the proper point when machining a wrist pin bushing or other article, thus securing further convenience in the operation of the tool.

As hereinbefore stated, the device is adapted for holding a connecting rod bushing in position while its connecting rod bearing 40 is being babbitted and for thereafter truing or machining the babbitted bushing, enabling both operations to be carried out with a minimum amount of time and labor. Also, as stated, the supporting bar 13, which gives stable support to the tool spindle, is adjustable vertically on the post. By this means the bar may be raised with the spindle to a position to permit a piston to be inserted under and in alinement with the spindle or arbor 5, so that the device may be used for reaming and truing wrist pin bushings after the same have been fitted in the piston.

Having thus fully described my invention, I claim:—

1. In a device of the character described, a vertically disposed rotary tool carrying shaft, a horizontally disposed bar for supporting the shaft, means for supporting a connecting rod so as to dispose said rod and bar at oblique angles to each other for a working action of the tool carried by the shaft on a bearing portion of said rod, both the bar and the rod supporting means being adjustable toward and from the shaft and to different positions of elevation, and means for applying rotary motion to the shaft.

2. In a device of the character described, the combination of a base plate, said plate being provided with elongated slots arranged opposite each other and at an oblique angle to each other, a vertically disposed rotary tool carrying shaft arranged at a distance from said slots and on a line between the convering ends thereof, a post adjustable in one of said slots, a supporting bar for the shaft vertically adjustable on said post and shaft and adjustable with the post toward and from the shaft, a second post for supporting the wrist pin eye of a connecting rod so that the bearing end thereof may surround the shaft, said post being adjustable in the second-named slot and including adjustable wedge members forming an expanding mandrel to engage the wrist pin eye, whereby the shaft supporting bar and connecting rod will be arranged on lines conforming to the angular relation of the slots, and means for rotating and imparting a feed motion to the tool carrying shaft.

3. In a device of the character described, a base plate having a slot, a bar carried by the base plate, a tool carrying shaft journaled on said bar and having a feed engagement therewith, a mandrel adjustable in said slot and including a fixed wedge member, an adjustable wedge member, the said wedge members having their inclined faces abutting each other, and means adjustably connecting said wedge members so as to adapt the same to form an expanding mandrel for engagement with wrist pin eyes of different sizes of connecting rods.

4. In a device of the character described, a base plate, a post rising from the base plate, a supporting bar carried by said post, a tool carrying shaft journaled in and having a feed connection with said bar, a mandrel adapted to engage the crank wrist eye of the connecting rod and having a beveled surface, and a wedge element adapted for engagement with said beveled surface and having a cooperating beveled surface and adjustably connected with said mandrel for adjusting the connecting rod with relation to the work.

5. In a device of the character described, a base plate provided with slots converging in one direction, a post carried by the base plate and adjustable in one of said slots, a mandrel carried by the base plate and adjustable in the other slot, said mandrel being engageable with an eye of a connecting rod, a supporting bar carried by the post, a tool carrying shaft journaled in and having a feed engagement with said bar, and adjusting means engaging the mandrel, said mandrel and adjusting means having wedging surfaces for engagement with the wrist pin eye of the rod for adjusting said rod with relation to the working tool.

6. In a device of the character described, a base plate, a cutting element on said plate, a mandrel on said plate, a wedge member carried by said mandrel, a second wedge member alined with the first-named wedge member, the inclined sides of said members being engaged with each other, each of said members having bores, the bore of one of said wedge members being alined with the bore of the other, and means in said bores for moving said wedge members toward or away from each other.

In testimony whereof I affix my signature.

HENRY HARRY WEISKOFF.